J. C. FITZGERALD.
STANCHION.
APPLICATION FILED APR. 13, 1912.
1,091,646.
Patented Mar. 31, 1914.
2 SHEETS—SHEET 1.
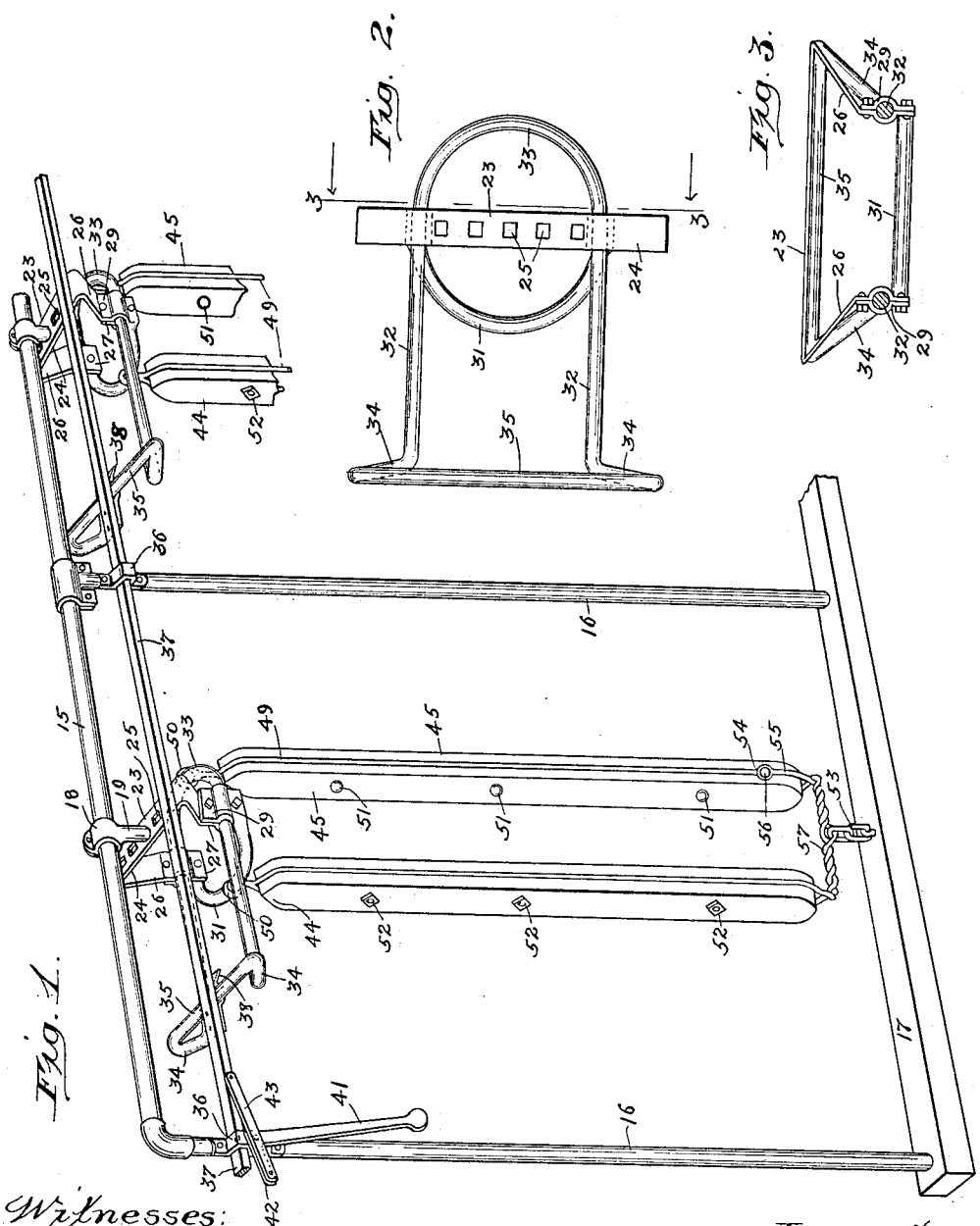
Witnesses:
Chas. E. Gorton
E. Newstrom
Inventor:
Jeremiah C. Fitzgerald
By Chas. C. Tillman
Atty.

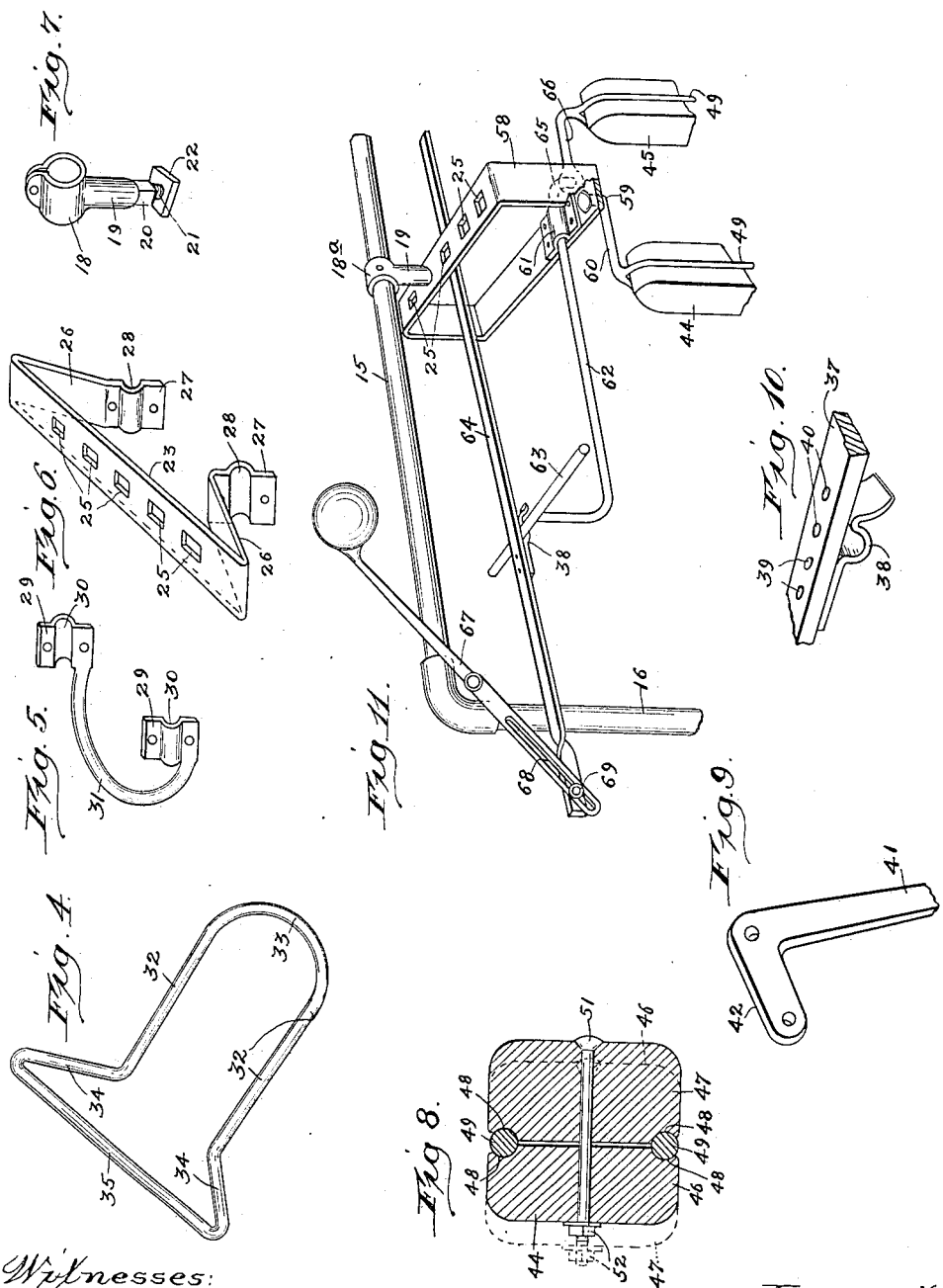

UNITED STATES PATENT OFFICE.

JEREMIAH C. FITZGERALD, OF KILBOURN, WISCONSIN, ASSIGNOR TO WEST BEND BARN EQUIPMENT COMPANY, OF WEST BEND, WISCONSIN.

STANCHION.

1,091,646. Specification of Letters Patent. Patented Mar. 31, 1914.

Application filed April 13, 1912. Serial No. 690,501.

*To all whom it may concern:*

Be it known that I, JEREMIAH C. FITZGERALD, a citizen of the United States, residing at Kilbourn, in the county of Columbia and State of Wisconsin, have invented certain new and useful Improvements in Stanchions, of which the following is a specification.

This invention relates to certain new and useful improvements in cattle stanchions and has particular reference to devices or an apparatus of this character comprising a pair of stanchions or clamping bars located vertically in parallelism with one another at one end of the several stalls or compartments for cows or animals, and mounted for rotary movement in a vertical plane, and it consists in certain peculiarities of the construction, novel arrangement, and operation of the various parts thereof, as will be hereinafter more fully set forth and specifically claimed.

The main and general object of the invention, is to provide simple and readily operable means, whereby animals may be secured and quickly released, one at a time, or simultaneously, in case of emergency, or otherwise.

Other objects and advantages of the invention will be disclosed in the subjoined description and explanation.

In order to enable others skilled in the art to which the invention pertains, to make and use the same I will now proceed to describe it referring to the accompanying drawings, in which—

Figure 1, is a perspective view of a portion of a stanchion support, showing a complete stanchion, embodying the invention mounted thereon and in its closed or locked position, and a part of another stanchion, which also embodies a part of the invention mounted thereon, and illustrating means for opening or separating the stanchion bars of each stanchion, simultaneously, or if desired, individually. Fig. 2, is a detached plan view of the adjustable support for one pair of the stanchion bars or clamping members. Fig. 3, is a view partly in section and partly in elevation taken on line 3—3, of Fig. 2, looking in the direction indicated by the arrows. Fig. 4, is a detached perspective view of one of the supporting and locking members for one of the stanchion bars of each pair. Fig. 5, is a similar view of a like part for the other stanchion member of each pair. Fig. 6, is a detached perspective view of the adjustable hanger for said supporting and locking members. Fig. 7, is a detached perspective view of one of the brackets or couplings used for supporting said adjustable hangers. Fig. 8, is a greatly enlarged cross sectional view of one of the upright stanchion or clamping members showing the details of its construction. Fig. 9, is a fragmental perspective view of a portion of a bell-crank lever used for unlocking a plurality of the stanchions at the same time and by the same operation. Fig. 10, is a fragmental perspective view of a portion of the sliding locking bar for the stanchions, and Fig. 11, is a similar view of a portion of the stanchion support showing a modification in the manner of operating the locking bar, and illustrating a portion of one pair of stanchion members adjustably mounted thereon.

Like numerals of reference refer to corresponding parts throughout the different views of the drawings.

In the present instance, the stanchions or clamping members for the necks of the cows or animals, are shown as being mounted, on a horizontally disposed rod or bar 15, which bar or rod, is illustrated as being supported by means of uprights 16, extended upwardly from a horizontally located beam or bar 17, which supporting structure may be located at that end of the several stalls in which the mangers are located, and which may be termed the head ends of the stalls, at which ends it is desirable to secure the heads of the animals, in such a manner that the same may have limited or comfortable movement of their heads, yet so that they cannot leave the stalls until released. Mounted on the supporting rod 15, between the upright 16, of the stanchion supporting structure is a bracket or coupling 18, each of which has a depending stem or shank 19, provided near its lower end with an angular portion 20, and below said angular portion with a reduced and screw threaded part 21, to engage a nut 22, used for securing an adjustable hanger 23, to said stem or shank. Each of the hangers 23, consists of a horizontally disposed portion 24, having a series of angular openings 25, of a size and shape to fit the angular portion 20, of the shank 19, of the coupling on which said hanger is mounted, and each of said hangers has at each end of the portion 24, a downwardly and inwardly extended part 26, each of which terminates at its free portion in a depending projection 27, each of which projections is provided with a transversely extended recess 28, or bearing for the arms of one of the locking and supporting members for the stanchion or clamping members.

When mounted on the supporting rod 15, each of the hangers 23, will extend transversely with respect to said rod and beneath the same, and will be prevented turning by reason of the angular portion 20, of the stem 19, and the angular opening in the hanger through which said stem is passed. Bolted to the outer surface of each of the extensions 27, of each of the hangers, is a plate or portion 29, each of which is provided with a transversely extended recess or bearing 30, to register with the bearings 28, in said extensions of the hanger.

As is clearly shown in Fig. 5, of the drawings, the plates 29, are formed on the ends of the curved member or rod 31, and extend upwardly from said rod so that when the plates or portions 29, are secured to the extensions 27, the curved rod 31, which constitutes a portion of the locking and supporting means for the clamping bars will lie horizontally in a plane below the horizontal plane of the bearings 28, and 30, through which bearings are extended the sides 32, of the other member of the locking and supporting means for one of the stanchion or clamping bars. The sides 32, of this latter member are connected at one of their ends by a curved part 33, and have at their other ends upwardly extended arms 34, which are united by a cross piece 35, which when the locking members are in position on the hanger 23, will lie horizontally and transversely beneath and with respect to the supporting rod 15. Each of the uprights 16, is provided near its upper portion with a guide 36, through which is extended a horizontally disposed bar 37, which has secured to its lower surfaces at proper points to engage the transverse portions 35, of one of the locking and supporting members for the stanchion bars, a spring catch 38, the location of each of which can be adjusted on the bar 37, by means of bolts 39, extended through openings 40, in said bar and suitable openings in each of said catches. Fulcrumed on one of the guides 36, of the supporting structure is a bell-crank lever 41, to the shorter arm 42, of which is pivotally connected at one of its ends a link 43, which is similarly connected at its other end to the locking bar 37, so that by turning the lever 41, in the proper direction, for instance, toward the stanchion or clamping members, the locking and supporting members having transverse portions 35, will be slid in their bearings on the hangers 23, thus separating the stanchion bars 44, and 45, at their upper portions and allowing the animal to withdraw its head from therebetween or if entering the stall to place its head in position between the bars 44, and 45, so that they may be closed on the necks of the animals which may be done by reversing the movement of the lever 41. If it is desired to release the animals one at a time, it is apparent that the spring catch 38, of each of the stalls or compartments can be depressed by hand and the locking members 32, having the transverse portions 35, slid in its bearings so as to spread the clamping bars 44, and 45, at their upper portions.

Each of the clamping bars 44, and 45, is made of two pieces or bars 46, and 47, preferably of wood, the latter being somewhat thicker than the former as is clearly shown in Fig. 8, of the drawings. These pieces 46, and 47, are formed at the edges of their meeting surfaces with longitudinal recesses 48, to receive metal rods 49, which are joined together at their upper ends above the upper end of the pieces 46, and provided at said ends with a ring 50, which loosely encircles the curved portions 31, and 33, of the locking and supporting members for the stanchion or clamping members. The pieces 46, and 47, of each of the clamping members, are secured together by means of bolts 51, and nuts 52, thereon, thus clamping the rods 49, between said members. The lower ends of the rods 49, are twisted as shown in Fig. 1, of the drawing, and said twisted portion is connected at about its middle by means of a chain 53, to the beam or bar 17, at the lower portion of the supporting structure. The rods 49, on one of the clamping members or stanchions, usually the one indicated by the reference numeral 45, are provided at their lower portions with an eye 54, to register with eyes on pieces 55, of said rods through which eyes and the lower portion of the member 45, is transversely extended a rod or pin 56, which will pivotally connect the member 45, to the twisted portion 57, which unites the lower portions of the rods 49, on the member 44, and the short rods 55, on the other clamping member. As the rings or hooks 50, at the upper ends of the members 44, and 45, are loosely mounted on the curved parts 31, and 33, of the locking and supporting members, and as the lower portion of the members 44, and 45, are loosely connected to the bar or beam 17, it is apparent that the pair of members 44, and 45, will have a rotary movement in a vertical plane as well as a swinging movement at its lower portion, thus affording comfort to the neck of the animal.

As animals are of different lengths, and have necks of different thicknesses, it is desirable that the members 44, and 45, may be adjusted on the hangers 23, which can be done by removing the shank 19, from one of the openings 25, in said hanger and then by replacing said shank in the proper one of the said openings in order to retract or advance the members 44, and 45, when the hanger can be secured in place on the shank 19, by means of the nut 22. By making one of the pieces 46, and 47, of greater thickness than the other, it is apparent that if the distance between the members 44, and 45, should be desired to be increased to accommodate a cow or animal having a thicker neck, the positions of the pieces 44, and 47, on the rods 49, may be reversed.

In Fig. 11, of the drawings, is shown a modification in the construction of the means for supporting and locking the stanchion or members 44, and 45, which consists in employing a hanger 58, which is rectangular in shape and has in its upper portion a series of angular openings 25, to receive the angular portion 20, of the stem 19, of the coupling 18ª, which can be adjustably mounted on the rod 15, of the supporting structure. Near one of its ends and in its lower portion the hanger 58, is provided with an opening 59, in which is pivotally secured one end of an arm 60, with which the upper ends of the rods 49, of one of the stanchion or clamping bars is provided. The lower portion of the hanger 58, is also provided with a bearing plate 61, through which is loosely extended a rod 62, which has one of its ends upturned and provided with a transverse portion 63, to lie directly under a locking bar 64, and to engage the spring catch 38, secured to said locking bar. The other end of the rod 62, is downturned as at 65, and is pivotally connected to an arm 66, with which the upper portions of the rods 49, of the other stanchion or clamping member 45, is provided. Fulcrumed on the upright 16, of the supporting structure is a weighted lever 67, which is provided in its lower portion with a slot 68, to receive a pin 69, which loosely connects said lever to one end of the locking bar 64, which arrangement will permit said bar to be moved back and forth by the proper movement of the lever 67, and thus separate or cause the members 44, and 45, to be approximated. In this modification, it will be understood that the lower portion of the members 44, and 45, may be connected together and to the cross piece 17, in a similar manner to that shown in Fig. 1, of the drawings, and that rotary movement as well as swinging movement of the members 44, and 45, will be afforded as in the first named construction.

Having thus fully described my invention what I claim as new and desire to secure by Letters-Patent is—

1. In a stanchion, the combination with an elevated support, of a hanger suspended therefrom, a curved member horizontally mounted on said hanger, another member having a portion curved in the opposite direction from the first named curved member and movable horizontally on said hanger, and a pair of vertical clamping members loosely connected at their upper portions to said curved members and loosely connected together and to a support at their lower portions.

2. In a stanchion, the combination with an elevated support, of a hanger suspended therefrom, a curved member horizontally mounted on said hanger, another member having a portion curved in the opposite direction from the first named curved member and movable horizontally on said hanger, a pair of vertical clamping members loosely connected at their upper portions to said curved members and loosely connected together and to a support at their lower portions, and means to reciprocate the movable curved member.

3. In a stanchion, the combination with an elevated support, of a hanger horizontally and adjustably mounted thereon and depending therefrom, a curved member horizontally mounted on said hanger, another member having a portion curved in the opposite direction from the first named curved member and movable horizontally on said hanger, a pair of vertical clamping members loosely connected at their upper portions to said curved members and loosely connected together and to a support at their lower portions, and means to reciprocate the movable curved member and to lock the same.

4. In a stanchion, a stanchion or clamping member consisting of a bar made of two pieces each having at the edges of their meeting surfaces recesses, means to detachably secure said pieces together, and metal rods located in the recesses of said pieces and a connection uniting said rods at the ends of said pieces.

5. In a stanchion, the combination with a pair of spaced apart clamping members, of reinforcing metal pieces applied to opposite sides of each of said members and connected together near their lower ends to form a flexible connection for the lower portions of said members, and supporting means for the upper portion of said members whereby they may be separated and approximated.

JEREMIAH C. FITZGERALD.

Witnesses:
R. D. BARNEY,
A. C. DENNISON.

Copies of this patent may be obtained for five cents each, by addressing the "Commissioner of Patents, Washington, D. C."